US008195345B2

(12) United States Patent
Omar et al.

(10) Patent No.: US 8,195,345 B2
(45) Date of Patent: Jun. 5, 2012

(54) METHOD OF GENERATING AN INTEGRATED FUZZY-BASED GUIDANCE LAW FOR AERODYNAMIC MISSILES

(75) Inventors: Hanafy M. Omar, Dhahran (SA); Mohammad A. Abido, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 116 days.

(21) Appl. No.: 12/851,498

(22) Filed: Aug. 5, 2010

(65) Prior Publication Data

US 2012/0036096 A1    Feb. 9, 2012

(51) Int. Cl.
*G01C 23/00* (2006.01)
(52) U.S. Cl. .......... 701/3; 701/4; 701/6; 701/7; 701/14; 701/27; 701/30.2; 701/30.4; 701/31.2; 701/32.9; 701/42; 701/44; 701/57; 701/58; 701/60; 701/68; 701/106; 701/400; 701/408; 700/28; 700/29; 700/30; 700/31; 700/32; 700/33; 700/34; 700/44; 700/55; 706/13; 706/14; 706/15; 706/45; 706/900; 706/2; 706/3; 706/4; 706/5; 706/6; 706/905; 706/913; 244/3.1; 244/3.2; 244/3.3; 244/3.18; 244/17.11; 244/3.21; 244/26; 244/164; 244/171; 703/2; 703/8
(58) Field of Classification Search ............. 701/3, 4, 701/6, 7, 14, 23, 27, 30.2, 30.4, 32.9, 44, 701/57–60, 68, 106, 400, 408; 700/28–34, 700/44, 55; 706/13–15, 45, 900, 905, 913, 706/2–6; 244/3.1–3.3, 3.18, 17.11, 26, 3.21, 244/164, 171
See application file for complete search history.

(56) References Cited

U.S. PATENT DOCUMENTS

| | | | | |
|---|---|---|---|---|
| 7,383,236 B2 * | 6/2008 | Jin et al. | | 706/13 |
| 7,536,364 B2 * | 5/2009 | Subbu et al. | | 706/13 |
| 7,664,622 B2 * | 2/2010 | Ruetsch | | 703/2 |
| 7,783,583 B2 * | 8/2010 | Sendhoff et al. | | 706/13 |
| 2005/0177530 A1 * | 8/2005 | Jin et al. | | 706/45 |
| 2009/0177339 A1 * | 7/2009 | Chen et al. | | 701/3 |
| 2012/0036096 A1 * | 2/2012 | Omar et al. | | 706/14 |

FOREIGN PATENT DOCUMENTS

| | | |
|---|---|---|
| CN | 1734238 A | 2/2006 |
| JP | 2005316614 A | 11/2005 |
| JP | 2009099051 A | 5/2009 |

* cited by examiner

*Primary Examiner* — Redhwan K Mawari
(74) *Attorney, Agent, or Firm* — Richard C. Litman

(57) ABSTRACT

The method for generating an integrated guidance law for aerodynamic missiles uses a strength Pareto evolutionary algorithm (SPEA)-based approach for generating an integrated fuzzy guidance law, which includes three separate fuzzy controllers. Each of these fuzzy controllers is activated in a unique region of missile interception. The distribution of membership functions and the associated rules are obtained by solving a nonlinear constrained multi-objective optimization problem in which final time, energy consumption, and miss distance are treated as competing objectives. A Tabu search is utilized to build a library of initial feasible solutions for the multi-objective optimization algorithm. Additionally, a hierarchical clustering technique is utilized to provide the decision maker with a representative and manageable Pareto-optimal set without destroying the characteristics of the trade-off front. A fuzzy-based system is employed to extract the best compromise solution over the trade-off curve.

10 Claims, 13 Drawing Sheets

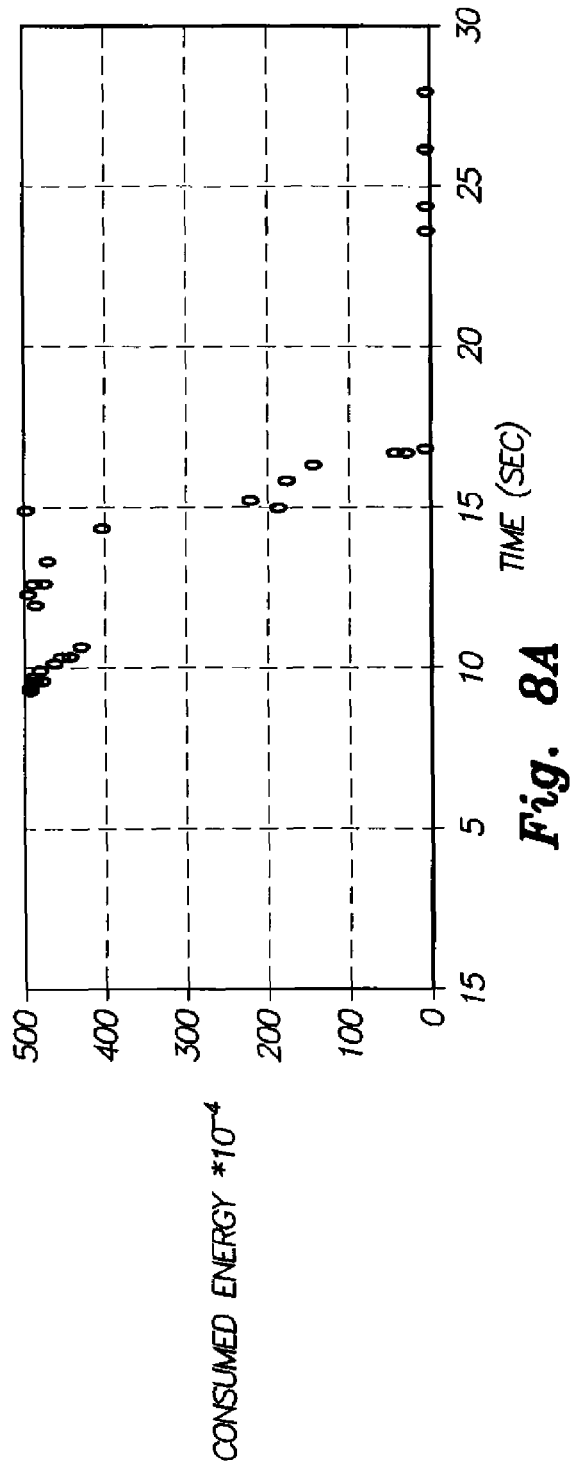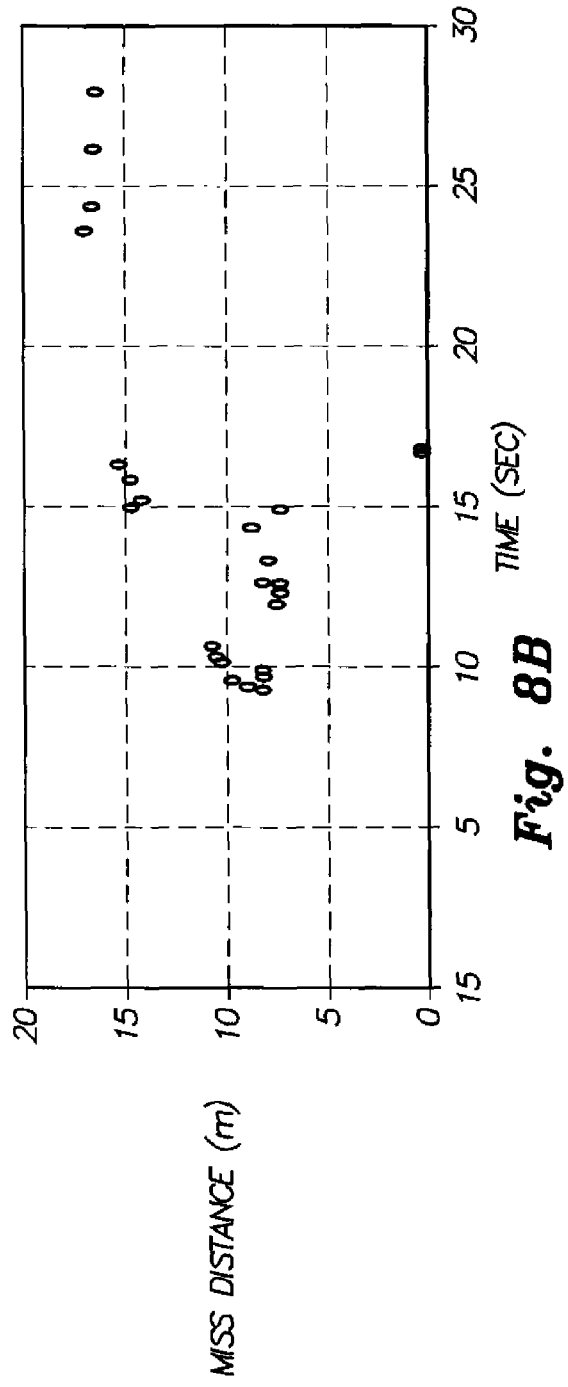

METHOD OF GENERATING AN INTEGRATED FUZZY-BASED GUIDANCE LAW FOR AERODYNAMIC MISSILES

BACKGROUND OF THE INVENTION

1. Field of the Invention

The present invention relates to guidance systems for surface-to-air missiles, and particularly to a method of generating an integrated, fuzzy-based guidance law for aerodynamic missiles that uses a strength Pareto evolutionary algorithm (SPEA) based approach and a Tabu search to determine the initial feasible solution for the algorithm to select between one of three fuzzy controllers implementing different guidance laws to issue a guidance command to the missile.

2. Description of the Related Art

Guidance technology of missiles includes many well known guidance laws which are regularly utilized. The guidance and control laws typically used in current tactical missiles are mainly based on classical control design techniques. These conventional control approaches, however, are often not sufficient to obtain accurate tracking and interception of a missile. Therefore, advanced control theory must be applied to a missile guidance and control system in order to improve its performance. Fuzzy control has suitable properties to eliminate such difficulties, however, at the present time, there is very limited research related to fuzzy missile guidance design.

Fuzzy logic has been applied to change the gain of the proportional navigation guidance (PNG) law. Such a fuzzy-based controller was also used in the design of guidance laws where the line of sight (LOS) angle and change of LOS angle rate are used as input linguistic variables, and the lateral acceleration command can be used as the output linguistic variable for the fuzzy guidance scheme. It is known that these fuzzy guidance schemes perform better than traditional proportional navigation or augmented proportional navigation schemes; i.e., these methods result in smaller miss distances and lower acceleration commands.

In the above, though, the parameters of the fuzzy guidance law are generated by trial and error, which consumes time and effort, as well as computational power, and the results are not necessarily optimal. Moreover, such conventional methods and systems use only one type of guidance through the entire interception range. Each of the classical guidance laws has a particular region of operation in which they are found to be superior to other guidance laws.

In general, the multi-objective missile guidance law design problem can be converted to a single objective problem through the linear combination of different objectives as a weighted sum. The important aspect of this weighted sum method is that a set of non-inferior (or Pareto-optimal) solutions can be obtained by varying the weights. Unfortunately, this requires multiple runs, with the number runs being equivalent to the number of desired Pareto-optimal solutions. Furthermore, this method cannot be used to find Pareto-optimal solutions in problems having a non-convex Pareto-optimal front.

Evolutionary algorithms, however, may be used to efficiently eliminate most of the difficulties of classical methods. Since they use a population of solutions in their search, multiple Pareto-optimal solutions can be found in one single run. A multi-objective evolutionary algorithm (MOEA) must be started with a feasible solution, which is usually obtained by trial and error, thus requiring very high computational time.

It would be desirable to make such a methodology more efficient through the usage of a systematic technique to get the initial feasible solution, such as through the usage of a Tabu search (TS). TS is a higher level heuristic algorithm for solving combinatorial optimization problems. It is an iterative improvement procedure which starts from any initial solution and attempts to determine a better solution. TS has recently become a well-established optimization approach that is rapidly spreading to a variety of fields.

Now referring to actual missile guidance and control, we assume for the sake of simplicity that a missile's motion is constrained in the vertical plane. Furthermore, the missile may be modeled as a point mass with aerodynamic forces applied at the center of gravity. Thus, from the missile's balanced forces shown in FIG. 2, the equations of motion for the missile can be written as:

$$\dot{\gamma}_m = \frac{(L + T\sin\alpha)}{mV_m} - \frac{g\cos\gamma_m}{V_m} \tag{1a}$$

$$\dot{V}_m = \frac{(T\cos\alpha - D)}{m} - g\sin\gamma_m \tag{1b}$$

$$\dot{x}_m = V_m \cos\gamma_m \tag{1c}$$

$$\dot{h}_m = V_m \sin\gamma_m \tag{1d}$$

$$L = \frac{1}{2}\rho V_m^2 S_{ref} C_L \tag{1e}$$

$$C_L = C_{L\alpha}(\alpha - \alpha_o) \tag{1f}$$

$$D = \frac{1}{2}\rho V_m^2 S_{ref} C_D \tag{1g}$$

$$C_D = C_{Do} + k C_L^2 \tag{1h}$$

where L, D, and T represent the lift, drag and thrust forces acting on the missile, respectively, $\rho$ is the air density, $S_{ref}$ is the reference surface area, $Y_m$ represents the missile heading angle, $\alpha$ represents the missile angle of attack, m represents the missile mass, $V_m$ represents the missile velocity, g is the gravitational acceleration, $x_m$ and $h_m$ are the horizontal and vertical positions of the missile, respectively, $C_L$ represents the lift coefficient, and $C_D$ represents the drag coefficient.

The aerodynamic derivatives $C_{L\alpha}$, $C_{D0}$ and k are given as functions of the Mach number M, while the thrust and the mass are functions of time. The angle of attack $\alpha$ is used as the control variable and the missile normal acceleration can be determined from:

$$a_m = \dot{\gamma}_m V_m = \frac{(L + T\sin\alpha)}{m} - g\cos\gamma_m \tag{2}$$

where the target is assumed to be a point mass with a constant velocity $V_t$ and acceleration $a_t$. The direction and position of the target in the horizontal and vertical directions are determined from the following relations:

$$\dot{\gamma}_t = \frac{a_t}{V_t} \tag{3a}$$

$$\dot{x}_t = V_t \cos\gamma_t \tag{3b}$$

$$\dot{h}_t = V_t \sin\gamma_t. \tag{3c}$$

From the interception geometry shown in FIG. 3, the line of sight angle rate and the derivative of the relative distance between the missile and the target can be written as:

$$\dot{\theta} = (V_m \sin(\theta-\gamma_m) - V_t \sin(\theta-\gamma_t))/r \qquad (4a)$$

$$\dot{r} = -V_m \cos(\theta-\gamma_m) + V_t \cos(\theta-\gamma_t). \qquad (4b)$$

In the above, θ represents the line of sight angle, r represents the distance between the missile and the target, and $V_t$ represents the target velocity. For any surface-to-air missile, there are three guidance phases. The first phase of the trajectory is called the "launch" or "boost" phase, which occurs for a relatively short time. The function of the launch phase is to take the missile away from the launcher base. At the completion of this phase, midcourse guidance is initiated. The function of the midcourse guidance phase is to bring the missile near to the target in a short time. The last few seconds of the engagement constitute the terminal guidance phase, which is the most crucial phase, since its success or failure determines the success or failure of the entire mission.

There are two basic guidance laws governing homing missiles: Pursuit Guidance (PG) and the Proportional Navigation Guidance (PNG). PG guides the missile to the current position of the target, whereas PNG orientates the missile to an estimated interception point. Therefore, PNG has smaller interception time than PG, but this method may show unstable behavior for excessive values of the navigation constant. Thus, it is recommended to use PNG in the launching phase in order to get the fastest heading to the target, since stability is not a relatively large problem in this stage, while using PG in the terminal phase.

Since PNG is used during the boost phase to direct the missile velocity to the predicted interception location, the missile velocity should be aligned with the predicted interception velocity. Therefore, the missile command should be a function of a velocity error angle σ and its derivative. In the terminal phase, the position error dominates the final miss distance, thus it is recommended to use PG. The missile command must thusly be a function of the heading error δ in order to have a stable system with a minimum miss distance. During the midcourse phase, it is hoped that the missile reaches the terminal phase with the highest speed for the greatest distance possible and, at the same time, with a minimal heading error. Thus, the missile acceleration is a function of both variables.

The estimated value of the angle of this direction $\gamma_p$, can be obtained directly from the interception geometry in FIG. 3 as:

$$\gamma_p = \theta - \operatorname{atan}\left(\frac{V_T t_p \sin(\phi)}{r + V_T t_p \cos(\phi)}\right). \qquad (5)$$

The derivative of this angle is:

$$\dot{\gamma}_p = \dot{\theta} - \frac{V_T t_p [-\dot{r}\sin\varphi + \dot{\varphi}(V_T t_p + r\cos\varphi)]}{(V_T t_p)^2 + 2rV_T t_p \cos\varphi + r^2} \qquad (6)$$

where $t_p$ is the predicted time to intercept the target, which can be simply estimated as:

$$t_p \approx -\frac{r}{\dot{r}}. \qquad (7)$$

As will be discussed in greater detail below, a is a variable defining the distribution of the membership function. It would be desirable to use a multi-objective evolutionary algorithm (MOEA) in order to generate missile guidance laws without requiring start points found via trial and error. Thus, a method of generating an integrated guidance law for aerodynamic missiles solving the aforementioned problems is desired.

SUMMARY OF THE INVENTION

The present invention relates to the generation of an integrated guidance law for aerodynamic missiles. Particularly, a strength Pareto evolutionary algorithm (SPEA)-based approach is utilized for generating an integrated fuzzy guidance law, which includes three separate fuzzy controllers. Each of these fuzzy controllers is activated in a unique region of missile interception.

The distribution of membership functions and the associated rules are obtained by solving a nonlinear constrained multi-objective optimization problem in which final time, energy consumption, and miss distance are treated as competing objectives. Further, a Tabu search is utilized to build a library of initial feasible solutions for the multi-objective optimization algorithm.

Additionally, a hierarchical clustering technique is utilized to provide the decision maker with a representative and manageable Pareto-optimal set without destroying the characteristics of the trade-off front. A fuzzy-based system is employed to extract the best compromise solution over the trade-off curve.

The method includes the following steps: (a) establishing a missile launch guidance law $f_1(z)$, a missile midcourse guidance law $f_2(z)$ and a missile terminal guidance law $f_3(z)$, wherein z represents a vector containing fuzzy membership functions and guidance rules associated with each of the missile guidance laws; and (b) optimizing the missile launch guidance law $f_1(z)$, the missile midcourse guidance law $f_2(z)$ and the missile terminal guidance law $f_3(z)$ by simultaneously minimizing the following set of equations:

$$\text{Minimize} \begin{cases} f_1(z) = t_f \\ f_2(z) = \int_0^{t_f} a_M^2 \, dt \\ f_3 = r(t_f), \end{cases}$$

wherein $t_f$ represents missile interception time, t represents time, r represents a distance between the missile and a target, and $a_M$ represents a missile normal acceleration, and further $|r(t_f)| < r_{miss-allowed}$, where $r_{miss-allowed}$ represents pre-selected allowable miss distance.

The minimization is performed by a strength Pareto evolutionary algorithm having the following steps: (c) initializing a feasible population by generating an initial population and generating an empty external Pareto-optimal set, where the feasible population is selected to satisfy a missile guidance constraint, wherein the missile guidance constraint is the pre-selected allowable miss distance; (d) searching the feasible population for non-dominated individuals and copying the non-dominated individuals into the external Pareto set; (e) searching the external Pareto set for the non-dominated individuals and removing all dominated solutions from the external Pareto set.

Then, (f) if the number of the individuals stored in the external Pareto set exceeds a pre-specified maximum size, then reducing the set by clustering; (g) assigning a strength to each individual in the external Pareto set, where the strength is proportional to the number of individuals covered by that individual; (h) calculating a fitness of each individual in the population as the sum of the strengths of all external Pareto solutions which dominate that individual. A small positive number is added to the resulting sum to guarantee that Pareto solutions are most likely to be produced;

Then, the method proceeds by: (i) combining the population and the individuals of the external Pareto set; (j) selecting two individuals at random and comparing their respective fitnesses; (k) selecting the individual with the greater fitness and copying the individual with the greater fitness to a mating pool; (l) performing crossover and mutation operations to generate a new population.

Finally, the method concludes by: (m) checking for pre-selected stopping criteria, where the pre-selected stopping criteria includes a miss distance that is less than the pre-selected allowable miss distance. If a pre-selected stopping criterion is satisfied, then optimization is ceased and the optimal population is recorded. If a pre-selected stopping criterion is not satisfied, then the previous population is replaced with the new population and the method returns to step (d).

In the above, the search is stopped if the generation counter exceeds its maximum number.

These and other features of the present invention will become readily apparent upon further review of the following specification and drawings.

BRIEF DESCRIPTION OF THE DRAWINGS

FIG. 8A is a Pareto front graph illustrating an exemplary missile's consumed energy as a function of time.

FIG. 8B is a Pareto front graph illustrating an exemplary missile's travel distance as a function of time.

These and other features of the present invention will become readily apparent upon further review of the following specification and drawings.

DETAILED DESCRIPTION OF THE PREFERRED EMBODIMENTS

Figure 1:
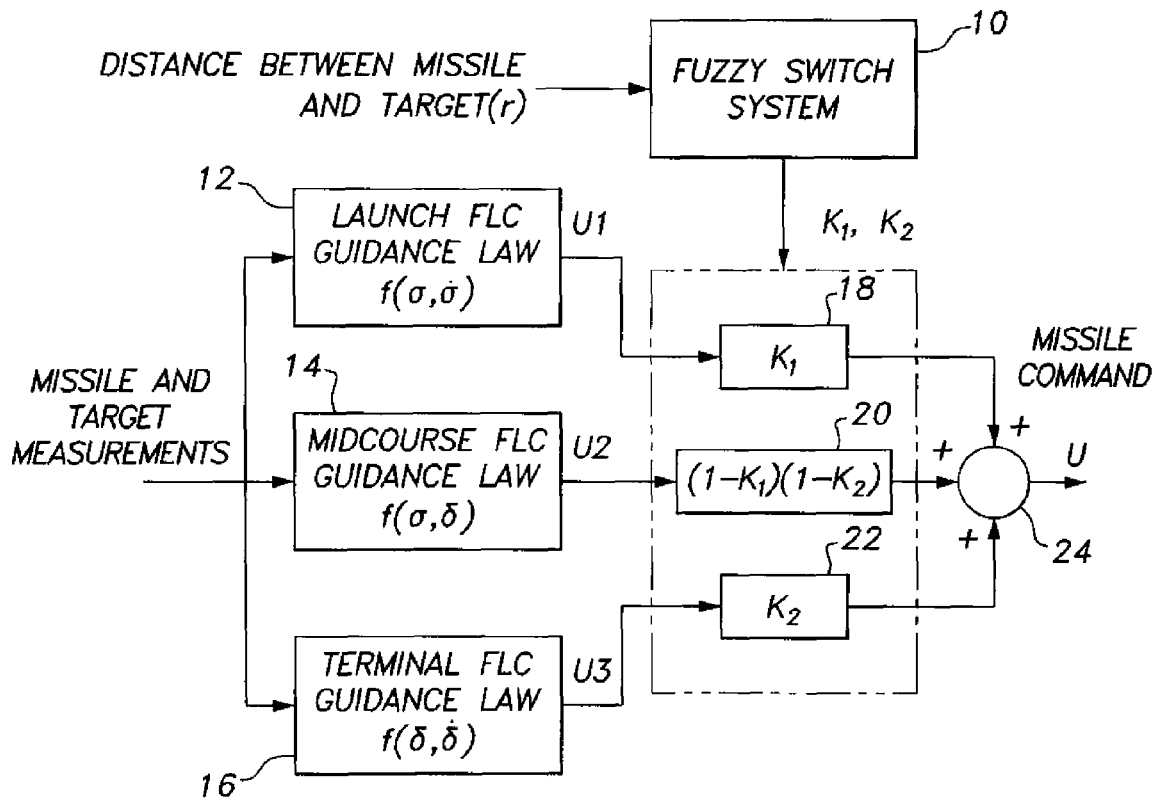
FIG. 1 is a block diagram of a system implementing the method of generating an integrated guidance law for aerodynamic missiles according to the present invention.
Figure 2:
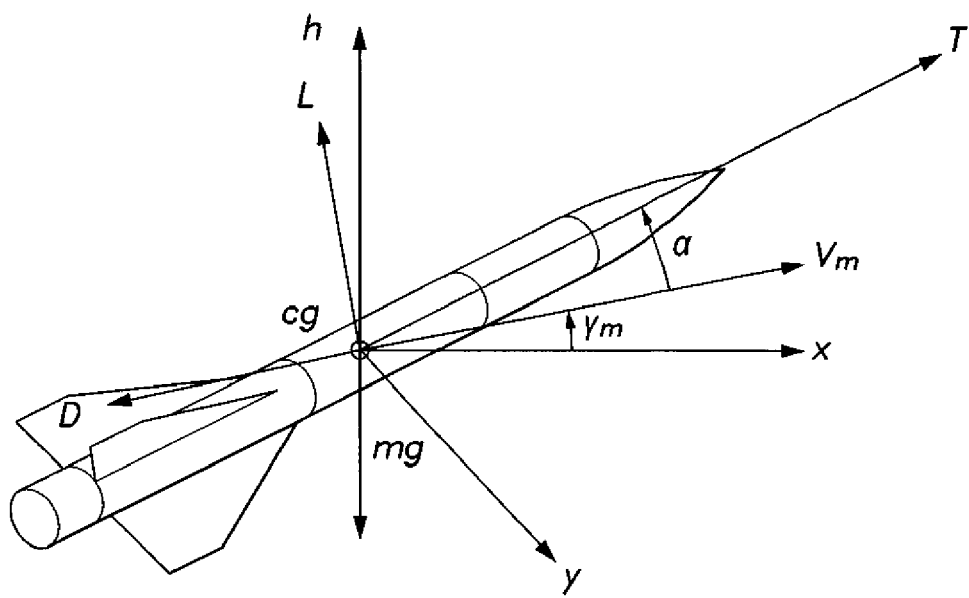
FIG. 2 is a diagram of a missile illustrating the variables typically utilized in aerodynamic missile guidance laws.
Figure 3:
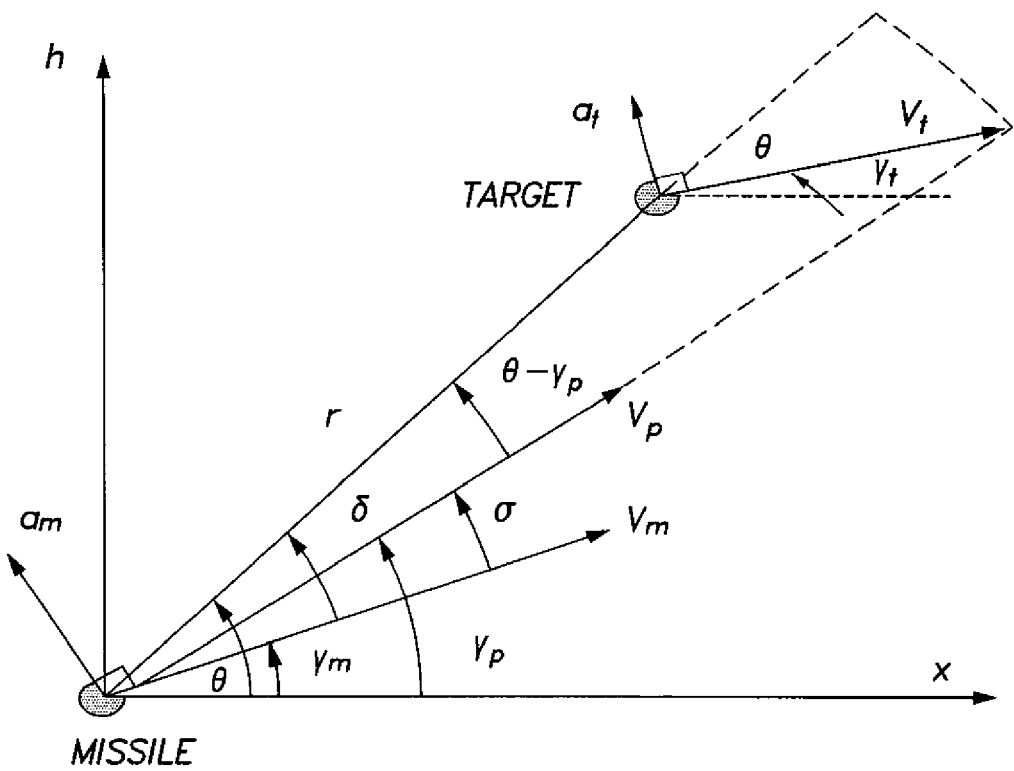
FIG. 3 is a diagram illustrating typical interception geometry for aerodynamic missiles.

FIG. 1 diagrammatically illustrates an overview of the integrated guidance law generated by the present method of generating an integrated guidance law for aerodynamic missiles. The method utilizes three separate fuzzy-based guidance laws for the launch, mid-course and terminal phases, respectively. In FIG. 1, the launch fuzzy law controller (FLC) is shown as block 12, the midcourse FLC is shown as block 14, and the terminal FLC is shown as block 16. A fuzzy switching controller 10, with two gains, is used to provide smooth transitioning between the three separate guidance laws 12, 14, 16. These switching gains are determined from the following fuzzy rules:

If $r$ is Big($B$) then $K_1=1$ and $K_2=0$(launch phase); (8a)

If $r$ is Medium($M$) then $K_1=0$ and $K_2=0$(Midcourse phase); (8b)

If $r$ is Small($S$) then $K_1=0$ and $K_2=1$(Terminal Phase). (8c)

Figure 4:
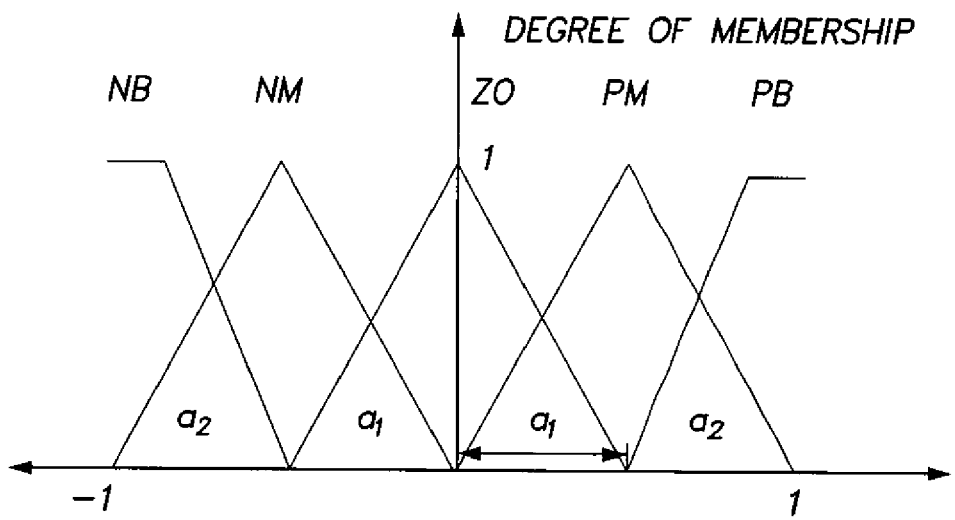
FIG. 4 is a chart illustrating typical normalized membership functions utilized in the method of generating an integrated guidance law for aerodynamic missiles according to the present invention.

The fuzzy controller 10 has three main components: scaling factors, membership functions and rules. The initial point in the generation of the fuzzy guidance law is to choose numbers and shapes of membership functions (MFs) for input and output variables. In the following, MFs with triangular shapes are chosen for all input and output variables, as illustrated in FIG. 4. All of the variables have positive and negative values, except for the range which is solely positive. Thus, only three MFs are used for the range and five MFs are used for the other variables.

The second step in the generation is to determine the scaling factors which convert the physical ranges of the fuzzy variables into the normalized ranges between −1 and 1. The scaling factors can be determined from the expected maximum values of the controller's variables, which are typically obtained from the engineering data regarding the particular missile's dynamics.

In order to complete the definition of the fuzzy guidance law, the rules which define the relationship between the control action and missile-target measurements should be determined. To include the linguistic rules in the optimization process, an integer encoding system is used to refer to the output fuzzy variables, as shown below in Table 1:

TABLE I

Encoding System for the FLC Output

| MF | NB | NS | ZO | PS | PB |
|---|---|---|---|---|---|
| Code | 1 | 2 | 3 | 4 | 5 |

In FIG. 1, the launch FLC guidance law 12 is shown as a function $f(\sigma, \dot{\sigma})$ or, in other words, as a function of the velocity error angle and its time derivative. The midcourse guidance law 14 is shown as a function $f(\sigma, \delta)$, or as a function of the error angle and the heading error. Missile and target measurements are used as an input for $\theta(\sigma, \delta)$. Similarly, the terminal FLC guidance law 16 is given as a function $f(\delta, \dot{\delta})$ or, in other words, as a function of the heading error and its time derivative.

The two gains of the fuzzy switching system 10 $K_1, K_2$ are, respectively, the output of launch FLC guidance law 12 and terminal FLC guidance law 16 (following output paths $u_1$ and $u_3$ to blocks 18, 22, respectively, in FIG. 1). The output of the midcourse FLC guidance law 14 (following path $u_2$ to block 20 in FIG. 1) is a function of $K_1$ and $K_2$, namely, $(1-K_1)(1-K_2)$. The input to the fuzzy switching controller 10 is the distance between the missile and the target r, and the ultimate output u is the missile guidance command.

Figure 5:
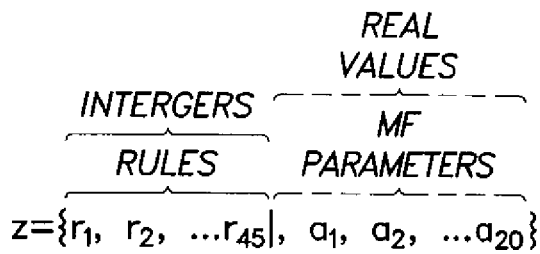
FIG. 5 is a chart illustrating a typical structure of a genetic algorithm individual.
Figure 6:
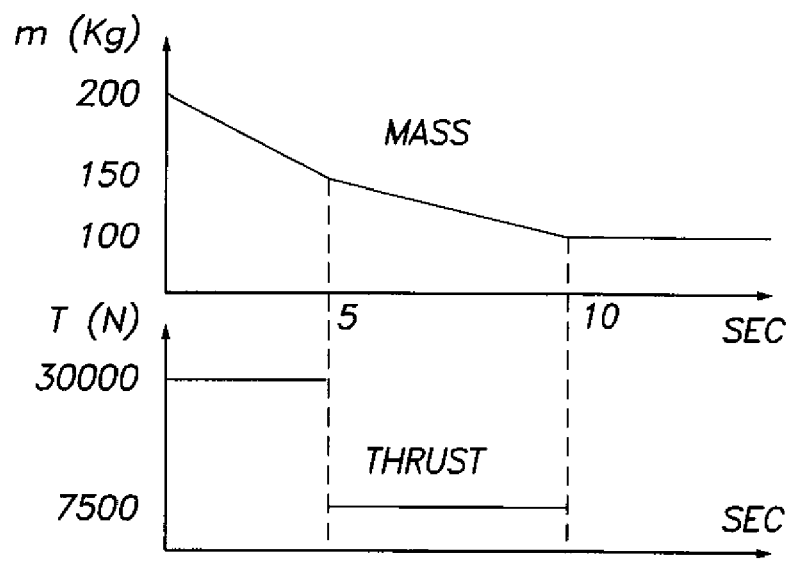
FIG. 6 is a graph illustrating an exemplary time history of missile mass and thrust.

In order to optimally tune the fuzzy parameters, the optimization problem can be formulated as follows:

$$\text{Minimize} \begin{cases} f_1(z) = t_f \\ f_2(z) = \int_0^{t_f} a_M^2 dt \\ f_3 = r(t_f) \end{cases} \quad (9)$$

which is the simultaneous minimization of the three fuzzy guidance laws $f_1$ 12, $f_2$ 14 and $f_3$ 16, respectively, subject to the condition $|r(t_f)| < r_{miss-allowed}$. In the above, $t_f$ is the interception time, $r_{miss-allowed}$ is the allowed miss distance, and z is a vector that contains the unknown parameters of the fuzzy guidance law (i.e., MFs and rules), as illustrated in FIG. 5. The rules are denoted by $r_n$, which can take only integer numbers between 1 and 5, according to the code shown in Table 1. The variables a that define the distribution of the membership function are real, with a range between 0 and 1.0, as shown in FIG. 4. In this problem, 45 rules and 20 variables define the MFs distributions.

In practice, many real-world problems involve simultaneous optimization of several objective functions. Generally, these functions are non-commensurable and often conflicting objectives. Multi-objective optimization with such conflicting objective functions gives rise to a set of optimal solutions, rather than only one optimal solution. The reason for the optimality of many solutions is that no single solution can be considered to be better than any other with respect to all objective functions. These optimal solutions are generally known as "Pareto-optimal" solutions.

A general multi-objective optimization problem consists of a number of objectives to be optimized simultaneously, and is associated with a number of equality and inequality constraints. The general multi-objective optimization problem can be formulated as follows:

$$\text{Minimize } f_i(x) \ i = 1, \ldots, N_{obj} \quad (10)$$

$$\text{Subject to: } \begin{cases} g_j(x) = 0 \quad j = 1, \ldots, M, \\ h_k(x) \leq 0 \quad k = 1, \ldots, K, \end{cases} \quad (11)$$

where $f_i$ is the $i^{th}$ objective function, x is a decision vector that represents a solution, and $N_{obj}$ is the number of objectives.

For a multi-objective optimization problem, any two solutions $x_1$ and $x_2$ can have one of two possibilities: either one dominates the other or none are dominant. In a minimization problem, without loss of generality, a solution $x_1$ dominates $x_2$ if and only if the following two conditions are satisfied:

$$\forall i \in \{1,2, \ldots, N_{obj}\} : f_i(x_1) \leq f_i(x_2) \quad (12)$$

$$\exists j \{1,2, \ldots, N_{obj}\} : f_j(x_1) < f_j(x_2) \quad (13)$$

If either of the above conditions is violated, the solution $x_1$ does not dominate the solution $x_2$. If $x_1$ dominates the solution $x_2$, then $x_1$ is called the "non-dominated solution" within the set. The solutions that are non-dominated within the entire search space are denoted as Pareto-optimal and constitute the Pareto-optimal set or Pareto-optimal front.

The strength Pareto evolutionary algorithm (SPEA) is an algorithm specifically designed for multi-objective optimization. This technique stores externally the individuals that represent a non-dominated front among all solutions considered thus far. All individuals in the external set participate in selection. SPEA uses the concept of Pareto dominance in order to assign scalar fitness values to individuals in the current population. The algorithm begins with assignment of a real value s in [0,1] (called the "strength") to each individual in the Pareto-optimal set. The strength of an individual is proportional to the number of individuals covered by it. The strength of a Pareto solution is, at the same time, its fitness.

Subsequently, the fitness of each individual in the population is the sum of the strengths of all external Pareto solutions by which it is covered. In order to guarantee that Pareto solutions are most likely to be produced, one is added to the resulting value. This fitness assignment ensures that the search is directed towards the non-dominated solutions and, at the same time, the diversity among dominated and non-dominated solutions is maintained.

Generally, the algorithm includes the following steps. First, Initialization: Generate an initial population and create the empty external Pareto-optimal set. Second, External set updating: The external Pareto-optimal set is updated by: (a) searching the population for the non-dominated individuals and copying them to the external Pareto set; (b) searching the external Pareto set for the non-dominated individuals and removing all dominated solutions from the set; and (c) if the number of the individuals externally stored in the Pareto set exceeds a pre-specified maximum size, reducing the set by clustering.

Third, Fitness assignment: Calculate the fitness values of individuals in both the external Pareto set and the population by: (a) assigning the strength s for each individual in the external set (the strength is proportional to the number of individuals covered by that individual); and (b) the fitness of each individual in the population is the sum of the strengths of all external Pareto solutions that dominate that individual. A small positive number is added to the resulting sum to guarantee that Pareto solutions are most likely to be produced.

Fourth, Selection: Combine the population and the external set individuals. Select two individuals at random and compare their fitness. Select the better one and copy it to the mating pool. Fifth, Crossover and Mutation: Perform the crossover and mutation operations according to their probabilities to generate the new population. Sixth and finally, Termination: check for stopping criteria. If any one criterion is satisfied, then stop. Otherwise, copy new population to old population and return to the Second step. In the following, the search will be stopped if the generation counter exceeds its maximum number.

The present method restricts the search within the feasible region. Therefore, a procedure is imposed to check the feasibility of the initial population individuals and the generated children through genetic algorithm (GA) operations. This ensures feasibility of the non-dominated solutions. However, filling the initial population with feasible solutions is a relatively time-consuming step, particularly with large-scale systems where the number of control variables is high. In such a case, producing a feasible solution randomly is relatively difficult and time-consuming.

Thus, the present method builds a database of feasible solutions to begin the SPEA technique with initial feasible solutions. The methodology used to generate the feasible solutions is the Tabu search technique. The Tabu search is a well known mathematical optimization method, belonging to the class of local search techniques. Tabu search enhances the performance of a local search method by using memory structures; i.e., once a potential solution has been determined, it is marked as "taboo" ("tabu" being a different spelling of the same word) so that the algorithm does not visit that possibility repeatedly.

The Pareto-optimal set can be extremely large, or even contain an infinite number of solutions. In this case, reducing the set of non-dominated solutions without destroying the characteristics of the trade-off front is desirable from the decision maker's point of view. An average linkage-based hierarchical clustering algorithm is employed to reduce the Pareto set to manageable size. The algorithm works iteratively by joining the adjacent clusters until the required number of groups is obtained.

In the present method, fuzzy set theory is implemented to efficiently derive a candidate Pareto-optimal solution for the decision makers. Upon generation of the Pareto-optimal set, the method presents a fuzzy-based mechanism to extract a Pareto-optimal solution as the best compromise solution. Due to the generally imprecise nature of the decision maker's judgment, the i-th objective function of a solution in the Pareto-optimal set, denoted as $F_i$, is represented by a membership function $\mu_i$, which is defined as:

$$\mu_i = \begin{cases} 1, & F_i \le F_i^{min}, \\ \frac{F_i^{max} - F_i}{F_i^{max} - F_i^{min}}, & F_i^{min} < F_i < F_i^{max}, \\ 0, & F_i \ge F_i^{max}. \end{cases} \quad (14)$$

where $F_i^{max}$ and $F_i^{min}$ are the maximum and minimum values of the i-th objective function, respectively.

For each non-dominated solution k, the normalized membership function $\mu^k$ is calculated as:

$$\mu^k = \frac{\sum_{i=1}^{N_{obj}} \mu_i^k}{\sum_{j=1}^{M} \sum_{i=1}^{N_{obj}} \mu_i^j} \quad (15)$$

where M represents the number of non-dominated solutions. The best compromise solution is the one having the maximum of $\mu^k$. Arranging all solutions in the Pareto-optimal set in descending order according to their membership function will provide the decision maker with a priority list of non-dominated solutions.

In order to test the accuracy of the present method, an exemplary missile, with a corresponding set of missile parameters, is introduced. For purposes of modeling and simulation, it is assumed that the missile under consideration has thrust and mass that vary with time, as shown in FIG. 5, while the other parameters are given as:

$$C_{L\alpha}=2.9+0.3M+0.25M^2+0.01M^3, \alpha_0=0$$

$$C_{Do}=0.45-0.01M, k=0.06, S_{ref}=0.08 \quad (16)$$

and the allowed miss distance is set to 2.0 m. The initial values for the missile variables are:

$$v_m=10m/s, \gamma_m=30°, r=5000m. \quad (17)$$

The maximum allowed ranges for the fuzzy input and output variables can be estimated as:

$$\alpha_{max} = 20°, \delta_{max} = \sigma_{max} = 20° \quad (18)$$

$$\dot\delta_{max} = \dot\sigma_{max} = \frac{a_{max}}{600} \approx 28.6 \text{ deg/sec}$$

and the target is assumed to have a constant speed of 400 m/sec with a constant acceleration of 3G (G=9.8 m/sec²). The initial values for the missile and target variables are:

$$v_m=10m/s, \gamma_m=30°, r=5000m$$

$$\theta=50°, \gamma_t=0 \quad (19)$$

and the simulation is performed using a variable step solver. The simulation stops when the closing velocity becomes positive. The time and the relative distance at that instant are the final interception time and the miss distance, respectively.

Figure 7:
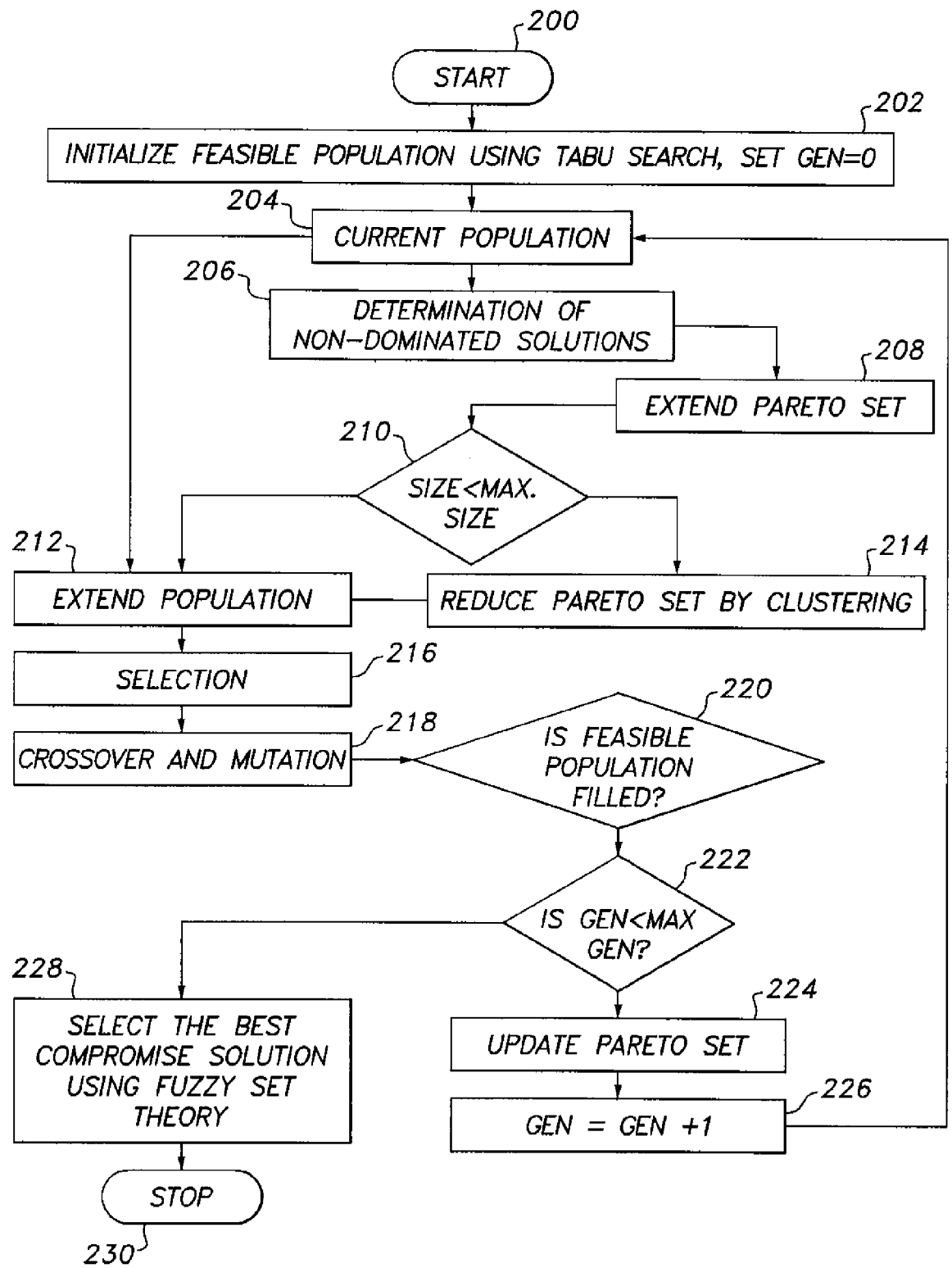
FIG. 7 is a flowchart illustrating the steps of a multi-objective evolutionary algorithm used in the method of generating an integrated guidance law for aerodynamic missiles according to the present invention.

FIG. 7 is a flowchart of the present method. The method begins at step 200. The algorithms must be started with a feasible population that satisfies the miss distance constraint. This initial population can be obtained randomly, but such a random generation would consume a great deal of time and computational power. Thus, at step 202, a Tabu search is utilized to obtain the initial feasible solution for MOEA. At step 202, the initial generation gen is set to zero. The Tabu search runs for a number of times equal to the number of individuals in each generation. At each run, the Tabu search randomly chooses a solution and tries to search around this solution to minimize the miss distance alone.

When the algorithm finds a solution that gives a miss distance that is less than the allowed value, it terminates and this solution is recorded. The procedure is repeated for a number of times equal to the number of individuals at each generation (denoted as $N_{ind}$). The obtained feasible solution is used as the initial generation of the MOEA. For the example given above, the Pareto front obtained after nearly 500 generations is shown in FIGS. 8A and 8B. A conflict between the missile acceleration commands and the interception time is observed, while the miss distance increases with the increase of the interception time.

Figure 9:
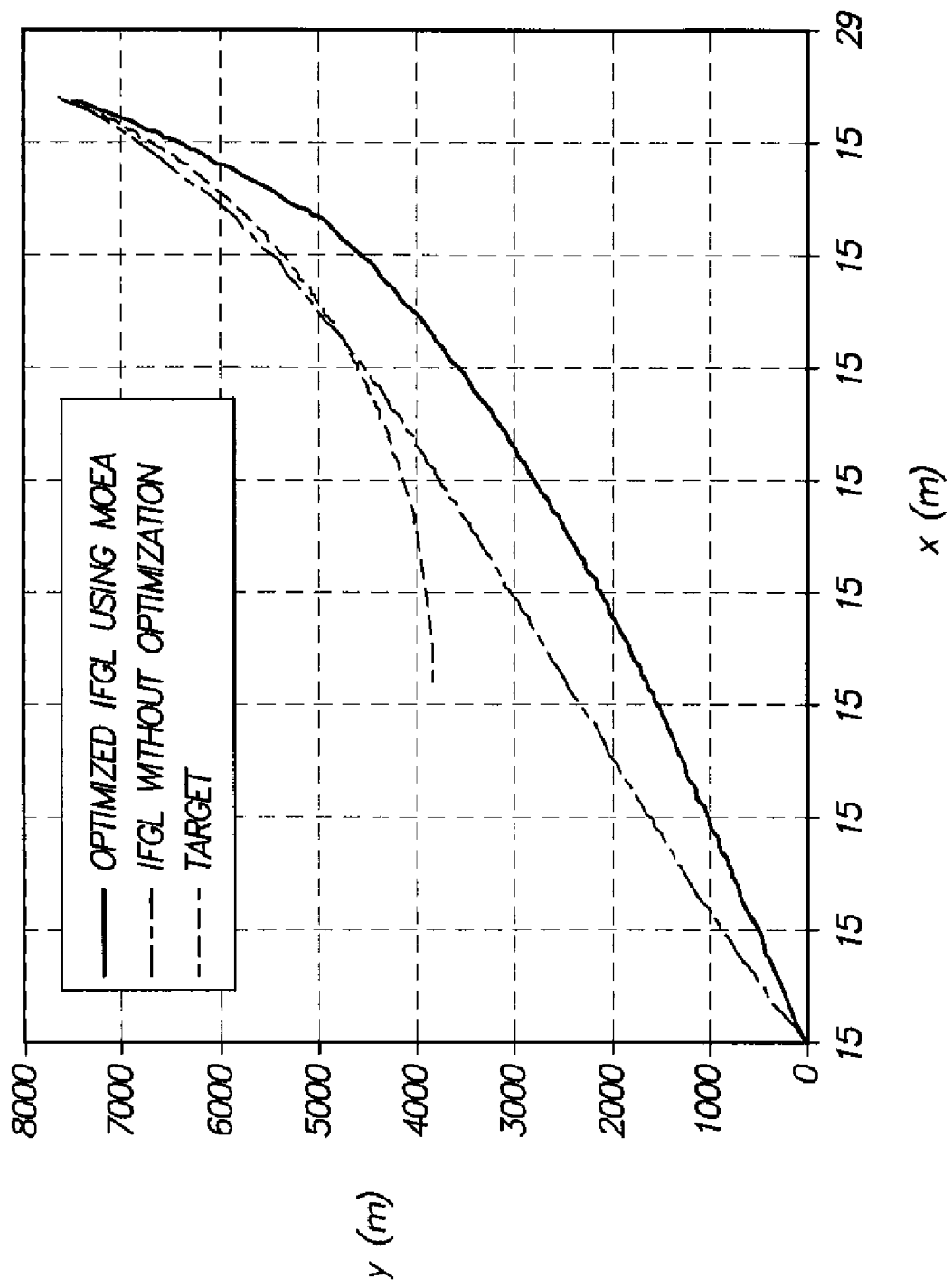
FIG. 9 is a comparison graph illustrating exemplary time history of the interception of a maneuvering target.
Figure 10:
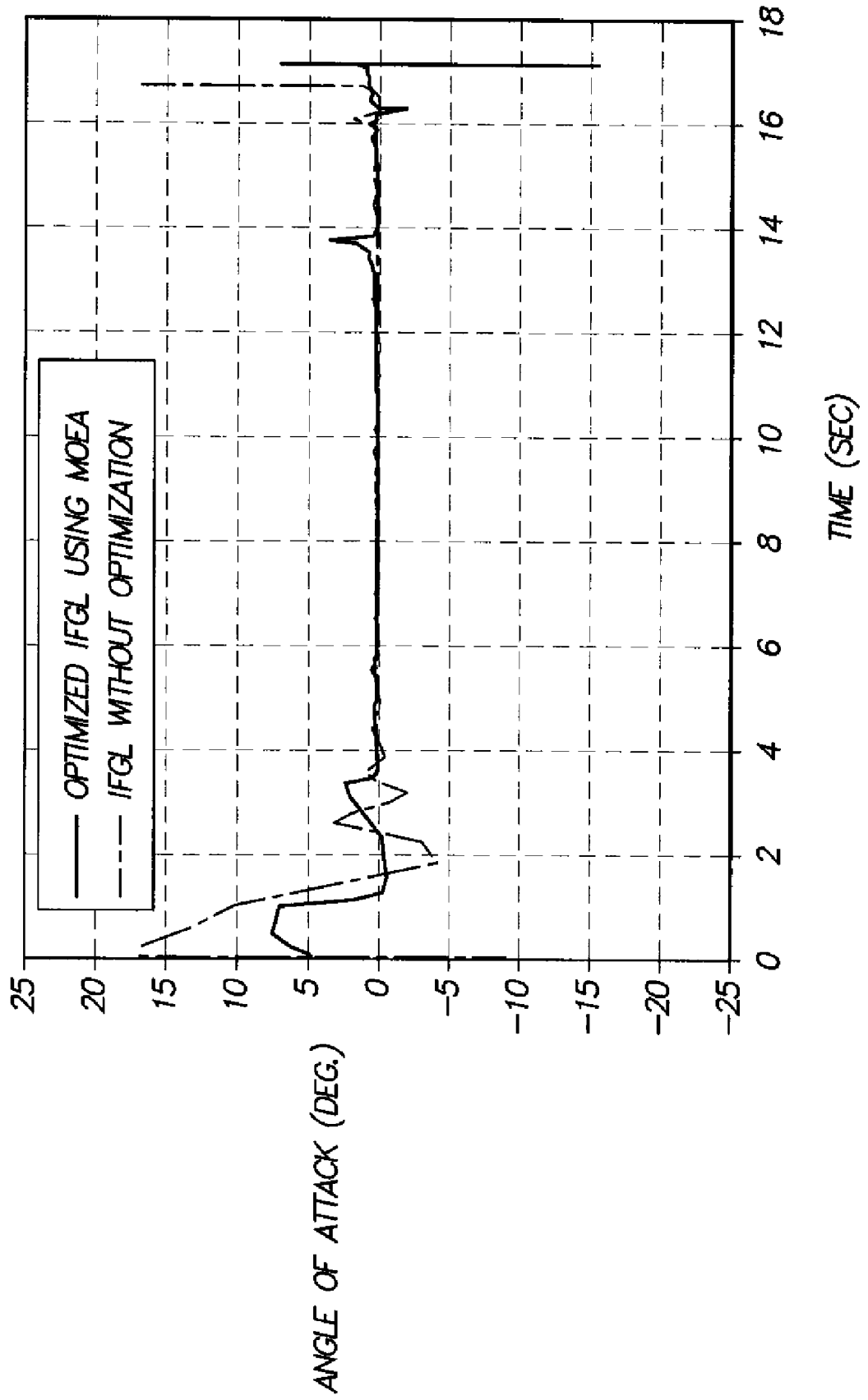
FIG. 10 is a comparison graph illustrating exemplary time history of an angle of attack for the maneuvering target of FIG. 9.
Figure 11A:
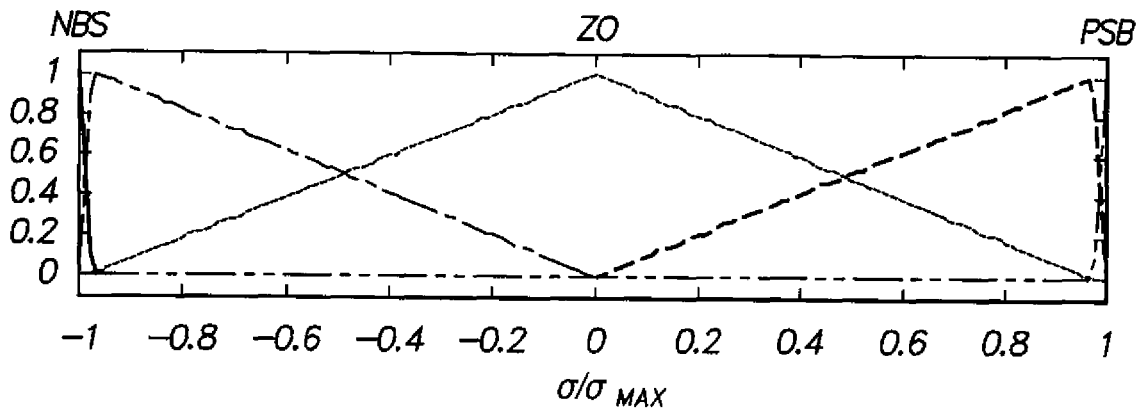
FIGS. 11A, 11B and 11C are graphs illustrating optimal membership functions for launching controllers associated with the multi-objective evolutionary algorithm of FIG. 7.
Figure 11B:
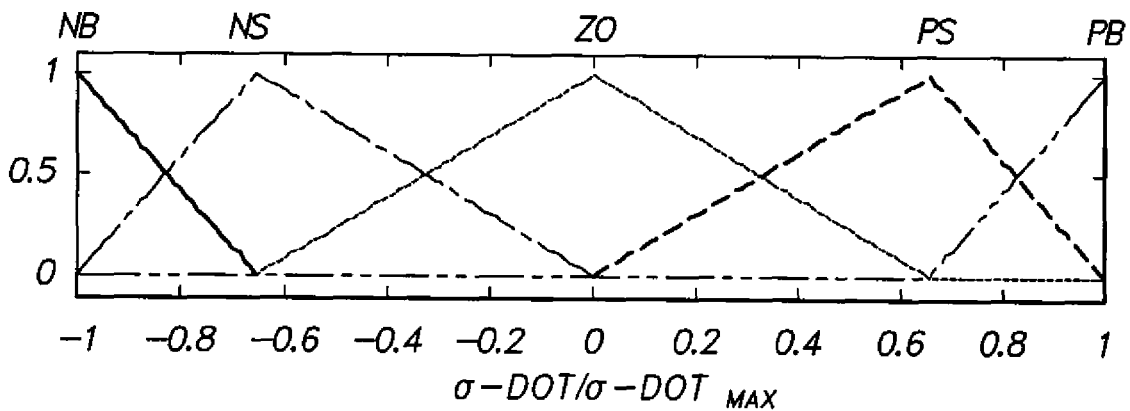
Figure 11C:
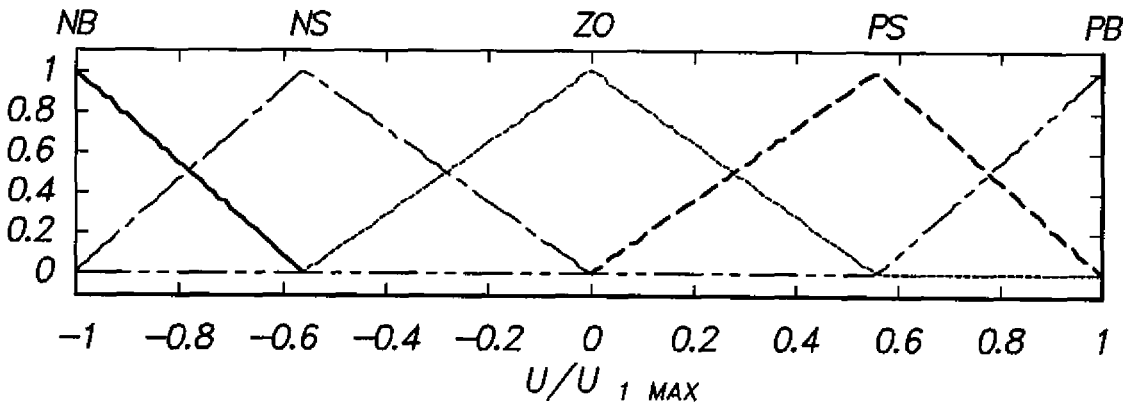
Figure 12A:
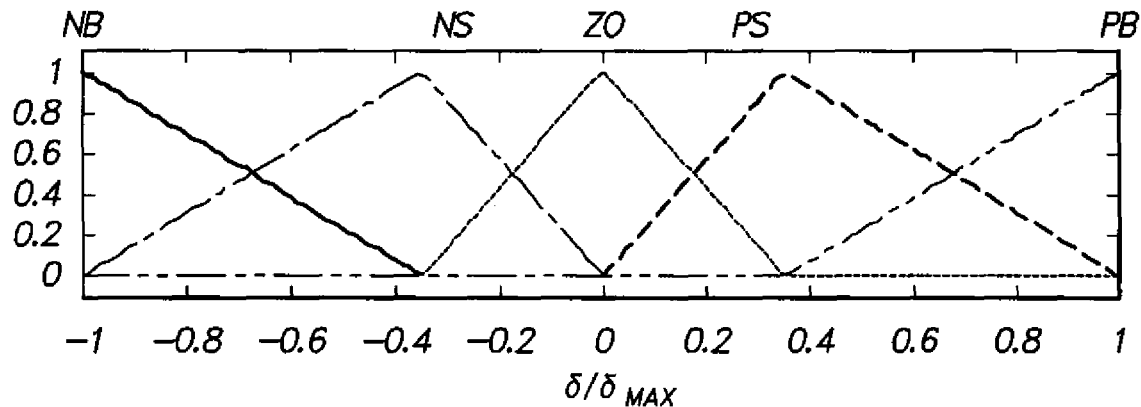
FIGS. 12A, 12B and 12C are graphs illustrating optimal membership functions for midcourse controllers associated with the multi-objective evolutionary algorithm of FIG. 7.
Figure 12B:
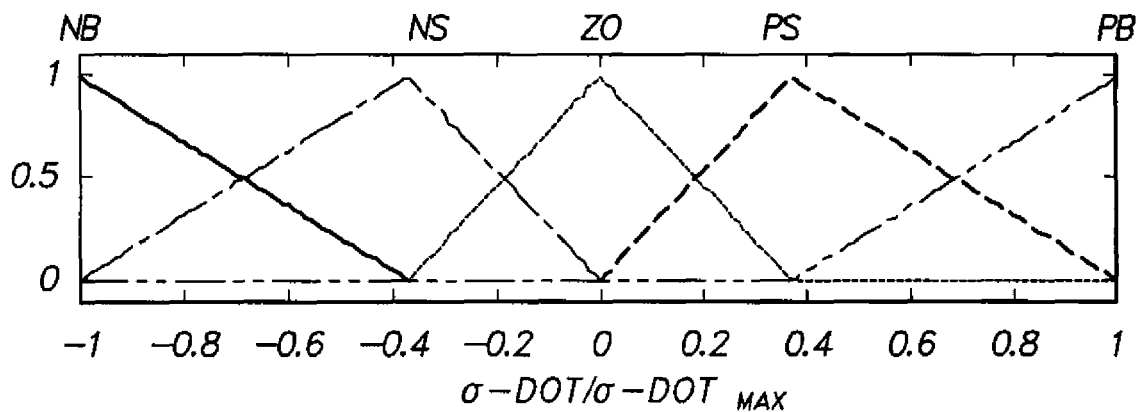
Figure 12C:
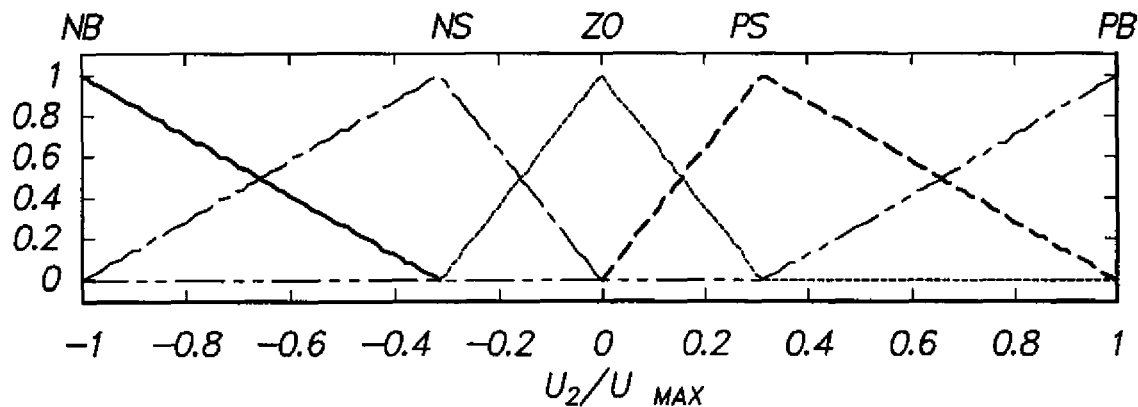
Figure 13A:
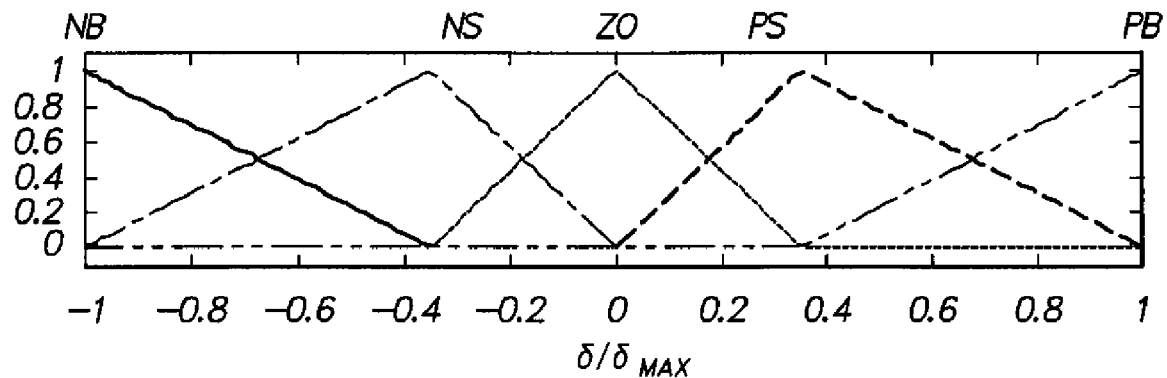
FIGS. 13A, 13B and 13C are graphs illustrating optimal membership functions for terminal controllers associated with the multi-objective evolutionary algorithm of FIG. 7.
Figure 13B:
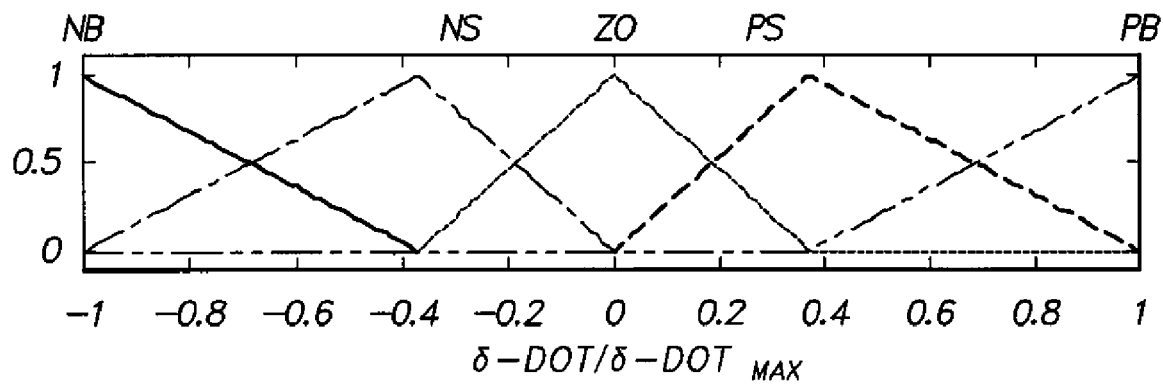
Figure 13C:
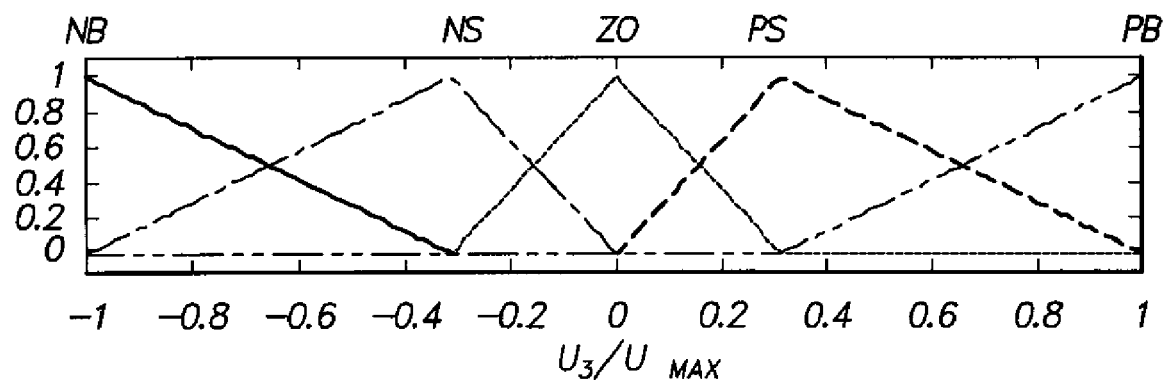
Figure 14:
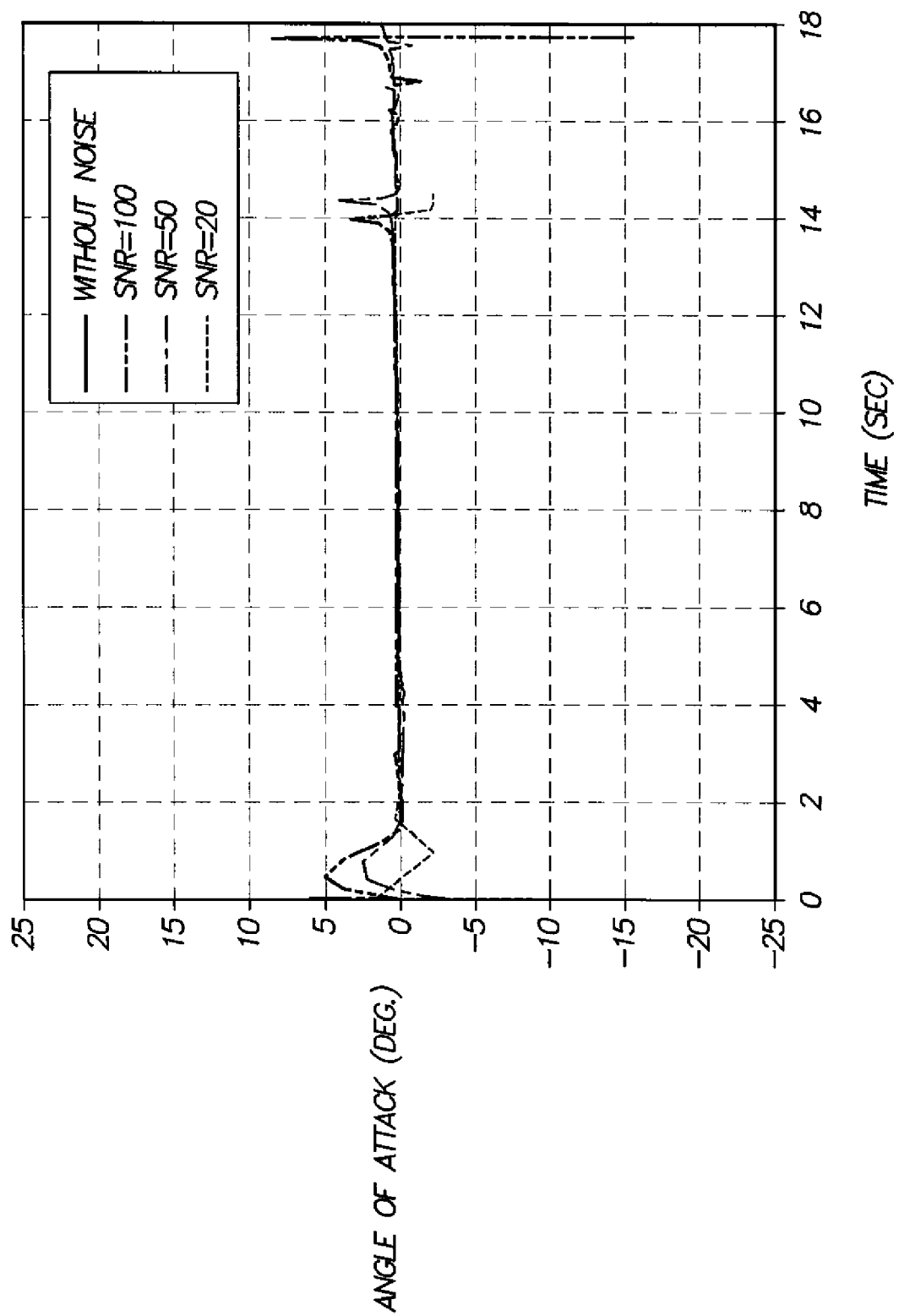
FIG. 14 is a comparison graph illustrating time history of control action generated by the integrated guidance law for aerodynamic missiles according to the present invention with differing signal-to-noise ratios.
Figure 15:
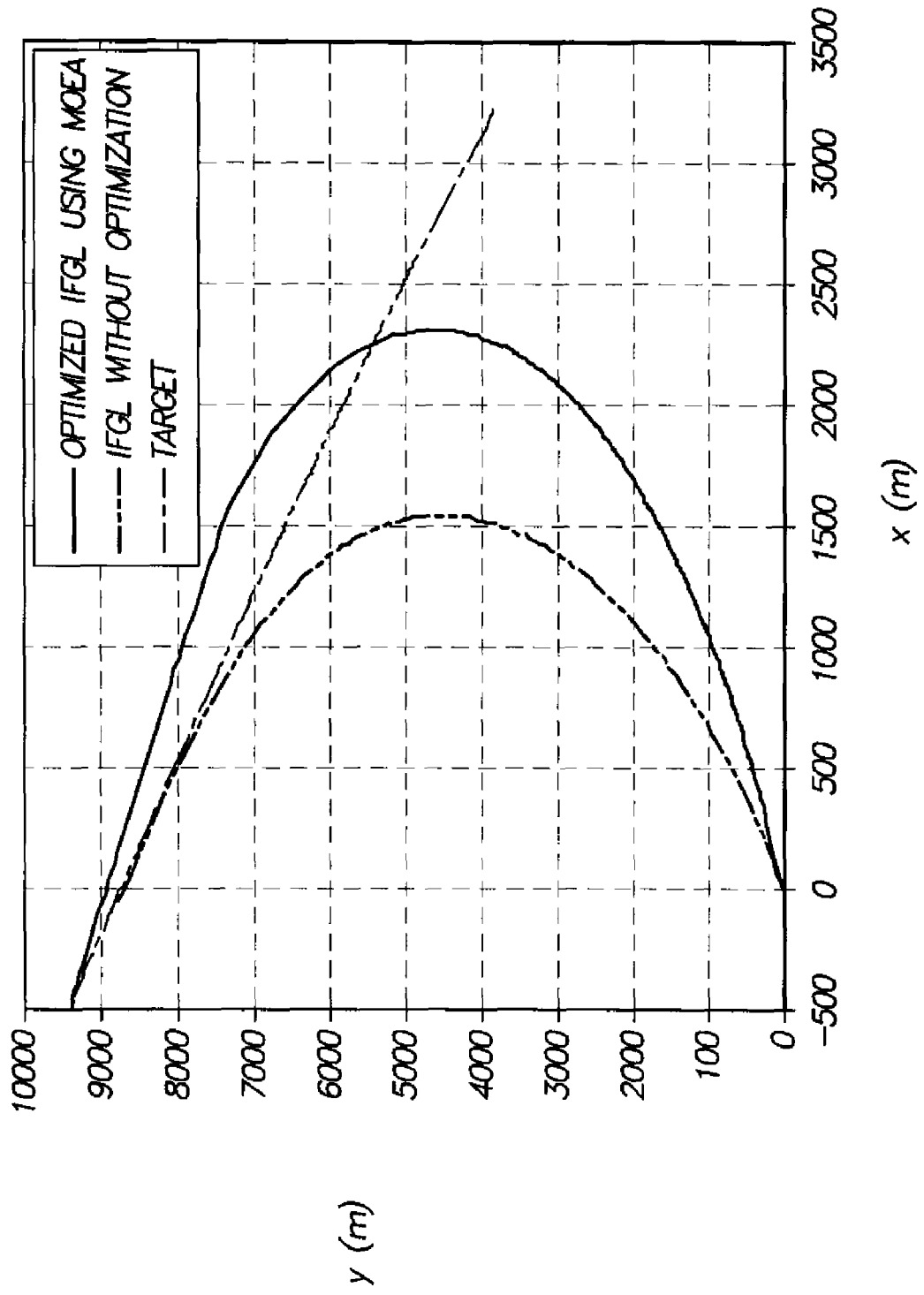
FIG. 15 is a comparison graph illustrating interception history for an exemplary non-maneuvering target.

If a guidance law that intercepts the target with a miss distance less than 10 m is chosen, then a set of controllers is produced. The best solution is obtained by the fuzzy algorithm. The time history of the interception variables is shown in FIGS. 9 and 10, which indicate that the obtained guidance law intercepts the target successfully. Thus, without any prior knowledge regarding the guidance rules or the distribution of the membership functions, the algorithms are able to generate guidance laws with satisfactory performance. The corresponding rules and MFs for this guidance law are show in FIGS. 11A, 11B and 11C, FIGS. 12A, 12B and 12C, FIGS. 13A, 13B and 13C, and Tables 2, 3 and 4, given below:

TABLE 2

Best rules for the launching controller obtained from MOEA

| u\ė | NB | NS | ZO | PS | PB |
|---|---|---|---|---|---|
| e | | | | | |
| NB | NS | NB | PB | NS | PB |
| NS | PS | PB | PB | PB | NS |
| ZO | PS | NS | ZO | PS | NS |
| PS | PS | NB | NB | NB | NS |
| PB | NB | PS | NB | PB | PS |

TABLE 3

Best rules for the terminal controller obtained from MOEA

| u\ė | NB | NS | ZO | PS | PB |
|---|---|---|---|---|---|
| e | | | | | |
| NB | PB | NS | NS | ZO | PB |
| NS | NS | PB | PB | NS | PS |
| ZO | PB | NS | ZO | PS | NB |
| PS | NS | PS | NB | NB | PS |
| PB | NB | ZO | PS | PS | NB |

TABLE 4

Best rules for midcourse controller obtained from MOEA

| u\ė | NB | NS | ZO | PS | PB |
|---|---|---|---|---|---|
| e | | | | | |
| NB | NS | NS | NB | NB | ZO |
| NS | NS | PB | PS | ZO | PS |
| ZO | NS | NB | ZO | PB | PS |
| PS | NS | ZO | NS | NB | PS |
| PB | ZO | PB | PB | PS | PS |

FIG. 9 illustrates the performance of the integrated fuzzy guidance law when the classical PD-Fuzzy rules are used with equally distributed membership functions (i.e., all a=0.5). This case represents a guidance law that is generated by engineering experience alone. The angles of attack from both guidance laws are shown in FIG. 10. It can be observed that the final interception time is slightly higher in the optimized case, but the miss distance recorded for the unoptimized case is approximately 70 cm, compared with approximately 2 cm for the optimized case. These results are expected, since more emphasis is placed on the miss distance the final guidance law is chosen among the set of laws in the Pareto set. However, a low level of the required angle of attack is observed for the optimized guidance law, which can be considered as another advantage of the law.

Returning to FIG. 7, the present method can be described with the following steps: (a) establishing a missile launch guidance law $f_1(z)$, a missile midcourse guidance law $f_2(z)$ and a missile terminal guidance law $f_3(z)$, wherein z represents a vector containing fuzzy membership functions and guidance rules associated with each of the missile guidance laws; and (b) optimizing the missile launch guidance law $f_1(z)$, the missile midcourse guidance law $f_2(z)$ and the missile terminal guidance law $f_3(Z)$ by simultaneously minimizing the following set of equations:

$$\text{Minimize} \begin{cases} f_1(z) = t_f \\ f_2(z) = \int_0^{t_f} a_M^2 dt \\ f_3 = r(t_f), \end{cases}$$

wherein $t_f$ represents missile interception time, t represents time, r represents a distance between the missile and a target, and $a_M$ represents a missile normal acceleration, and further $|r(t_f)| < r_{miss-allowed}$, where $r_{miss-allowed}$ represents pre-selected allowable miss distance.

The minimization is performed by a strength Pareto evolutionary algorithm having the following steps: (c) initializing a feasible population by generating an initial population and generating an empty external Pareto-optimal set (step 202), where the feasible population is selected to satisfy a missile guidance constraint, wherein the missile guidance constraint is the pre-selected allowable miss distance; (d) searching the feasible population for non-dominated individuals and copying the non-dominated individuals into the external Pareto set (step 204); (e) searching the external Pareto set for the non-dominated individuals and removing all dominated solutions from the external Pareto set (steps 206 and 208).

Then, (f) if the number of the individuals stored in the external Pareto set exceeds a pre-specified maximum size (step 210), then reducing the set by clustering (step 214); (g) assigning a strength to each individual in the external Pareto set, where the strength is proportional to the number of individuals covered by that individual; (h) calculating a fitness of each individual in the population as the sum of the strengths of all external Pareto solutions which dominate that individual. A small positive number is added to the resulting sum to guarantee that Pareto solutions are most likely to be produced.

Then, the method continues with (i) combining the population and the individuals of the external Pareto set (step 212); (j) selecting two individuals at random and comparing their respective fitnesses; (k) selecting the individual with the greater fitness and copying the individual with the greater fitness to a mating pool (step 216); (l) performing crossover and mutation operations to generate a new population (step 218).

Finally, the method concludes by: (m) checking for pre-selected stopping criteria (step 220), where the pre-selected stopping criteria includes a miss distance that is less than the pre-selected allowable miss distance. If a pre-selected stopping criterion is satisfied, then ceasing optimization (steps 228 and 230) and recording the optimal population. If a pre-selected stopping criterion is not satisfied, then replacing the previous population with the new population and returning to step (d) (steps 224 and 226).

In the above, the search is stopped if the generation counter exceeds its maximum number (step 222). Target position measurement is typically not precise and has a fuzzy distribution due to thermal and radar noises. Thus, white noise is embedded in the measured signals, which can be modeled by a Gaussian density function defined as:

$$f(x) = \frac{1}{\sqrt{2\pi\sigma^2}} e^{-\frac{(x-\mu)^2}{2\sigma^2}}, \tag{20}$$

where μ is the mean value and σ is the standard deviation.

The Matlab function "awng" (add white noise) has been used to add noise to three signals, which were used in evaluating the control action from the three fuzzy controllers. These signals are the range r, the line of sight angle $\theta$ and the rate of change of the line of sight angle $\dot{\theta}$. The performance of the best designed integrated Pareto fuzzy guidance law (IPFGL) obtained from the MOEA above with different signal to noise ratios is shown in Table 5 below:

TABLE 5

Performance of IPFGL designed by MOEA with the existence of noisy measurements

| Case | Interception time, $t_f$ (sec) | Miss distance, (m) | Acceleration $10^{-4} \times \int_0^{t_f} a_m^2 dt$ |
|---|---|---|---|
| Without noise | 17.03 | 0.02 | 29.64 |
| SNR = 100 | 17.72 | 0.878 | 49.12 |
| SNR = 50 | 18.38 | 6.080 | 88.97 |
| SNR = 20 | 14.5 | 2482 | 23.2 |

The results of Table 5 show that the designed IPFGLs perform well with the existence of noisy measurements, as indicated by the small miss distance when SNR=50. When the noise becomes very high (i.e., SNR=20), the missile cannot intercept the target due to incorrect information being sent to the guidance law which, in turn, sends an incorrect guidance action to the missile, as shown in FIG. 9.

Figure 16:
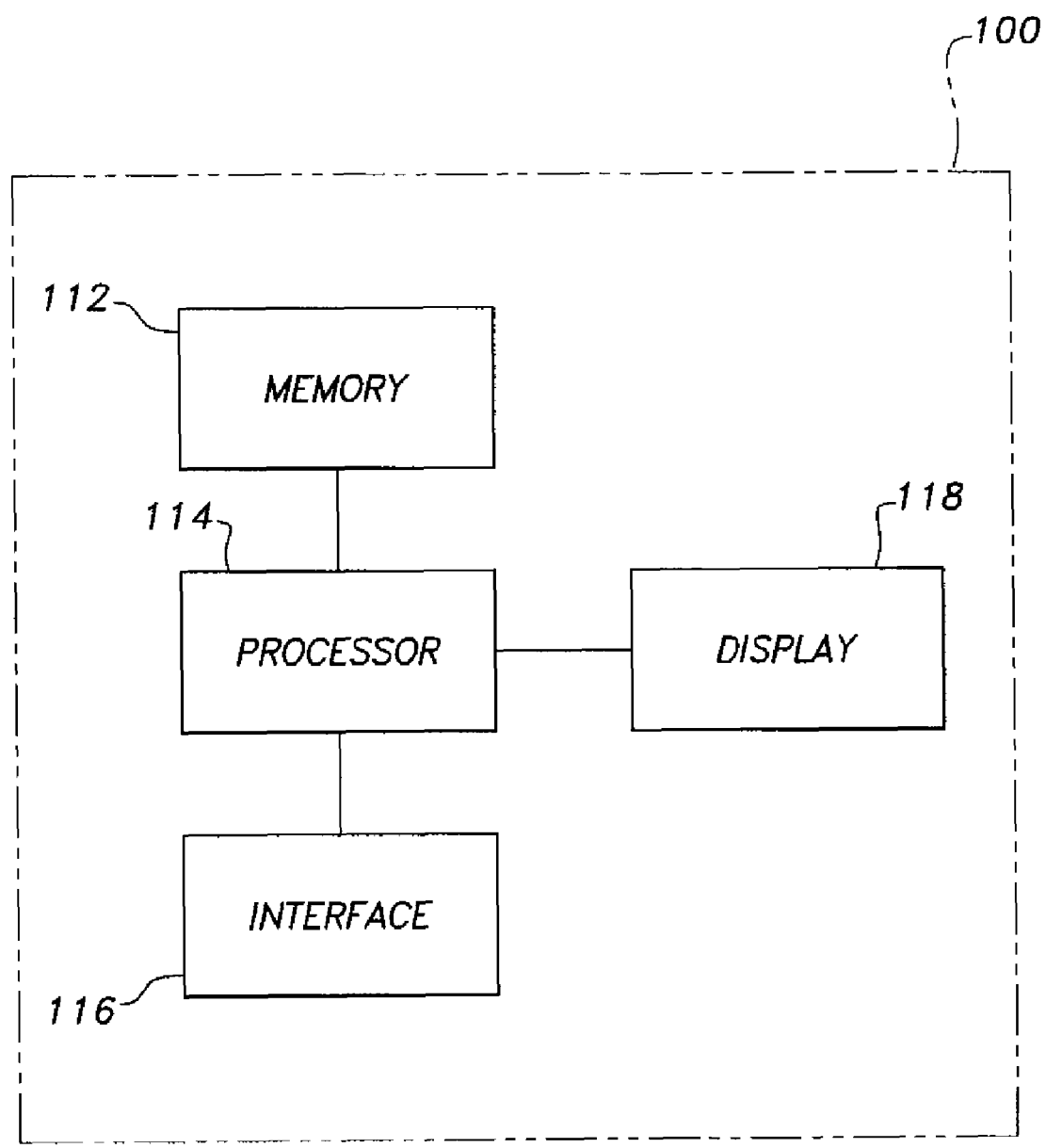
FIG. 16 is a block diagram illustrating system components for implementing the method of generating an integrated guidance law for aerodynamic missiles according to the present invention.

It should be understood that the calculations may be performed by any suitable computer system, such as that diagrammatically shown in FIG. 16. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

We claim:

1. A computerized method of generating an integrated fuzzy-based guidance law for aerodynamic missiles, comprising the steps of:

(a) establishing a missile launch guidance law $f_1(z)$, a missile midcourse guidance law $f_2(z)$ and a missile terminal guidance law $f_3(z)$, wherein z represents a vector containing fuzzy membership functions and guidance rules associated with each of the missile guidance laws, wherein each of the laws includes a fuzzy controller;

(b) optimizing the missile launch guidance law $f_1(z)$, the missile midcourse guidance law $f_2(z)$ and the missile terminal guidance law $f_3(z)$ by simultaneously minimizing the following set of equations:

$$\text{Minimize} \begin{cases} f_1(z) = t_f \\ f_2(z) = \int_0^{t_f} a_M^2 dt \\ f_3 = r(t_f), \end{cases}$$

wherein $t_f$ represents missile interception time, t represents time, r represents a distance between the missile and a target, and $a_m$ represents a missile normal acceleration, and further $|r(t_f)| < r_{miss-allowed}$ where $r_{miss-allowed}$ represents a pre-selected allowable miss distance; wherein the minimization is performed by a strength Pareto evolutionary algorithm having the following steps:

(c) initializing a feasible population by generating an initial population and generating an empty external Pareto-optimal set, the feasible population being selected to satisfy a set of missile guidance constraints, wherein the set of missile guidance constraints includes the pre-selected allowable miss distance;

(d) searching the feasible population for non-dominated individuals and copying the non-dominated individuals into the external Pareto set;

(e) searching the external Pareto set for the non-dominated individuals and removing all dominated solutions from the external Pareto set;

(f) if the number of the individuals stored in the external Pareto set exceeds a pre-specified maximum size, then reducing the set by clustering;

(g) assigning a strength to each individual in the external Pareto set, wherein the strength is proportional to the number of individuals covered by that individual;

(h) calculating a fitness of each individual in the population as a sum of the strengths of all external Pareto solutions which dominate that individual;

(i) combining the population and the individuals of the external Pareto set;

(j) randomly selecting two individuals and comparing their respective fitnesses;

(k) selecting the individual with the greater fitness and copying the individual with the greater fitness to a mating pool;

(l) performing crossover and mutation operations to generate a new population; and (m) checking for pre-selected stopping criteria and if a pre-selected stopping criterion is satisfied, then ceasing optimization and recording an optimal population, and if a pre-selected stopping criterion is not satisfied, then replacing the previous population with the new population and returning to step d), wherein the pre-selected stopping criteria includes a miss distance that is less than the pre-selected allowable miss distance;

whereby the integrated fuzzy-based missile guidance law is created for the interception of the target.

2. The computerized method of generating an integrated fuzzy-based guidance law for aerodynamic missiles as recited in claim 1, wherein following step (h), a pre-selected positive number is added to the sum of the strengths.

3. The computerized method of generating an integrated fuzzy-based guidance law for aerodynamic missiles as recited in claim 2, wherein the set of missile guidance constraints further includes missile final time.

4. The computerized method of generating an integrated fuzzy-based guidance law for aerodynamic missiles as recited in claim 3, wherein the set of missile guidance constraints further includes missile energy consumption.

5. The computerized method of generating an integrated fuzzy-based guidance law for aerodynamic missiles as recited in claim 4, wherein an i-th membership function $\mu_i$ of an i-th objective function of the Pareto-optimal set $F_i$, wherein i is an integer, is defined as:

$$\mu_i = \begin{cases} 1, & F_i \leq F_i^{min}, \\ \frac{F_i^{max} - F_i}{F_i^{max} - F_i^{min}}, & F_i^{min} < F_i < F_i^{max}, \\ 0, & F_i \geq F_i^{max}. \end{cases}$$

wherein $F_i^{max}$ and $F_i^{min}$ represent the maximum and minimum values of the i-th objective function, respectively.

6. The computerized method of generating an integrated fuzzy-based guidance law for aerodynamic missiles as recited in claim 5, wherein for each non-dominated solution k, a normalized membership function $\mu_k$ is calculated as:

$$\mu^k = \frac{\sum_{i=1}^{N_{obj}} \mu_i^k}{\sum_{j=1}^{M} \sum_{i=1}^{N_{obj}} \mu_i^j},$$

wherein j is an integer, $N_{obj}$ represents the number of objectives in the multi-objective optimization, and M represents the number of non-dominated solutions.

7. A computer software product that includes a non-transitory storage medium readable by a processor, the medium having stored thereon a set of instructions for generating an integrated guidance law for aerodynamic missiles, the instructions comprising:

a) a first sequence of instructions which, when executed by the processor, causes the processor to establish a missile launch guidance law $f_1(z)$, a missile midcourse guidance law $f_2(z)$ and a missile terminal guidance law $f_3(z)$, wherein z represents a vector containing fuzzy membership functions and guidance rules associated with each of the missile guidance laws;

b) a second sequence of instructions which, when executed by the processor, causes the processor to optimize the missile launch guidance law $f_1(z)$, the missile midcourse guidance law $f_2(z)$ and the missile terminal guidance law $f_3(z)$ by simultaneously minimizing the following set of equations:

$$\text{Minmize} \begin{cases} f_1(z) = t_f \\ f_2(z) = \int_0^{t_f} a_M^2 dt \\ f_3 = r(t_f), \end{cases}$$

wherein $t_f$ represents missile interception time, t represents time, r represents a distance between the missile and a target, and $a_m$ represents a missile normal acceleration, and further $|r(t_f)| < r_{miss-allowed}$ where $r_{miss-allowed}$ represents a pre-selected allowable miss distance, wherein the minimization is performed by a strength Pareto evolutionary defined by the following sets of instructions:

c) a third sequence of instructions which, when executed by the processor, causes the processor to initialize a feasible population by generating an initial population and generating an empty external Pareto-optimal set, the feasible population being selected to satisfy a set of missile guidance constraints, wherein the set of missile guidance constraints includes the pre-selected allowable miss distance;

d) a fourth sequence of instructions which, when executed by the processor, causes the processor to search the feasible population for non-dominated individuals and copying the non-dominated individuals into the external Pareto set;

e) a fifth sequence of instructions which, when executed by the processor, causes the processor to search the external Pareto set for the non-dominated individuals and removing all dominated solutions from the external Pareto set, wherein if the number of the individuals stored in the external Pareto set exceeds a pre-specified maximum size, then the set is reduced by clustering;

f) a sixth sequence of instructions which, when executed by the processor, causes the processor to assign a strength to each individual in the external Pareto set, wherein the strength is proportional to the number of individuals covered by that individual;

g) a seventh sequence of instructions which, when executed by the processor, causes the processor to calculate a fitness of each individual in the population as a sum of the strengths of all external Pareto solutions which dominate that individual;

h) an eighth sequence of instructions which, when executed by the processor, causes the processor to combine the population and the individuals of the external Pareto set;

i) a ninth sequence of instructions which, when executed by the processor, causes the processor to randomly select two individuals and comparing their respective fitnesses;

j) a tenth sequence of instructions which, when executed by the processor, causes the processor to select the individual with the greater fitness and copying the individual with the greater fitness to a mating pool;

k) an eleventh sequence of instructions which, when executed by the processor, causes the processor to perform crossover and mutation operations to generate a new population; and l) a twelfth sequence of instructions which, when executed by the processor, causes the processor to check for pre-selected stopping criteria and if a pre-selected stopping criterion is satisfied, then ceasing optimization and recording an optimal population, and if a pre-selected stopping criterion is not satisfied, then replacing the previous population with the new population and returning to the fourth sequence of instructions, wherein the pre-selected stopping criteria includes a miss distance that is less than the pre-selected allowable miss distance, whereby the integrated fuzzy-based missile guidance law is created for the interception of the target.

8. The computer software product that includes a medium readable by a processor, the medium having stored thereon a set of instructions for generating an integrated guidance law for aerodynamic missiles as recited in claim 7, further comprising a thirteenth sequence of instructions following the seventh sequence of instructions, which cause the processor to add a pre-selected positive number to the sum of the strengths.

9. The computer software product that includes a medium readable by a processor, the medium having stored thereon a set of instructions for generating an integrated guidance law for aerodynamic missiles as recited in claim 8, further comprising a fourteenth sequence of instructions which, when executed by the processor, causes the processor to establish an i-th membership function $\mu_i$ of an i-th objective function of the Pareto-optimal set $F_j$, wherein i is an integer, is defined as:

$$\mu_i = \begin{cases} 1, & F_i \leq F_i^{min}, \\ \dfrac{F_i^{max} - F_i}{F_i^{max} - F_i^{min}}, & F_i^{min} < F_i < F_i^{max}, \\ 0, & F_i \geq F_i^{max}. \end{cases}$$

wherein $F_i^{max}$ and $F_i^{min}$ represent the maximum and minimum values of the i-th objective function, respectively.

10. The computer software product that includes a medium readable by a processor, the medium having stored thereon a set of instructions for generating an integrated guidance law for aerodynamic missiles as recited in claim 9, further comprising a fifteenth sequence of instructions which, when executed by the processor, causes the processor to calculate a normalized membership function $\mu_k$ for each non-dominated solution k as:

$$\mu^k = \frac{\sum_{i=1}^{N_{obj}} \mu_i^k}{\sum_{j=1}^{M} \sum_{i=1}^{N_{obj}} \mu_i^j},$$

wherein j is an integer, $N_{obj}$ represents the number of objectives in the multi-objective optimization, and M represents the number of non-dominated solutions.

* * * * *